United States Patent [19]

Febonio

[11] 4,095,131

[45] June 13, 1978

[54] BRUSH HOLDER FOR MOTOR OR GENERATOR

[75] Inventor: Richard J. Febonio, Salem, Mass.

[73] Assignee: Torque Systems, Inc., Waltham, Mass.

[21] Appl. No.: 697,196

[22] Filed: Jun. 17, 1976

[51] Int. Cl.[2] .............................................. H02K 13/00

[52] U.S. Cl. .............................................. 310/239

[58] Field of Search ............... 310/239, 240, 241, 242, 310/245, 246, 247, 249, 71

[56] References Cited

U.S. PATENT DOCUMENTS

| | | | |
|---|---|---|---|
| 2,128,598 | 8/1938 | Williamson | 310/240 |
| 2,548,631 | 4/1951 | Stapleton | 310/247 |
| 2,785,366 | 3/1957 | Goodwin | 310/241 |
| 3,436,578 | 4/1969 | Walter | 310/242 |
| 3,534,206 | 10/1970 | Carey | 310/247 |

FOREIGN PATENT DOCUMENTS

| | | | |
|---|---|---|---|
| 1,200,420 | 7/1970 | United Kingdom | 310/239 |

*Primary Examiner*—R. Skudy

*Attorney, Agent, or Firm*—Weingarten, Maxham & Schurgin

[57] ABSTRACT

An electrical motor or generator brush holder for containing a brush having a terminal external to the holder. The holder comprises an electrically insulative body with a head portion containing an internally threaded recess for mating with a threaded cap for retention of a brush within the body. The head portion includes a transverse slit configured to permit insertion and removal of the electrical terminal of the brush via the recess and not materially affecting the strength of the holder.

5 Claims, 7 Drawing Figures

BRUSH HOLDER FOR MOTOR OR GENERATOR

FIELD OF THE INVENTION

This invention relates to electrical motors and generators and more particularly to brush holders therefor.

BACKGROUND OF THE INVENTION

In brush holders employed in electrical motors and generators it is useful for certain purposes to provide electrical connection to the brush via a terminal clip external to the holder and outside of the motor or generator housing. Such external connection is useful in providing an economical and direct electrical connection to the brush itself, rather than indirectly by way of the holder. Such external connection also eliminates internal wiring within the motor or generator housing to the brush. In a known brush assembly, the brush holder includes a body of electrically insulative material having a head portion containing a threaded recess adapted to receive a cap threaded therein for retention of the brush within a conductive sleeve disposed along the length of the holder body. The head includes a slot downwardly extending to the bottom of the head to accommodate the terminal clip of the brush. However, the provision of the slot results in a significant portion of the threaded head being absent; therefore, the head portion is relatively fragile and subject to breakage such as by striking or by driving the cap too tightly into the head. In order to enhance the strength of a conventional brush holder containing a slotted head for receipt of an external terminal clip, higher strength material must be employed in fabrication of the brush holder and resulting in a more expensive item.

SUMMARY OF THE INVENTION

In brief, the present invention provides a brush holder comprising a body of electrically insulative material having a head portion containing an internally threaded recess for mating with a threaded cap for retention of a brush within the body. The head portion includes a narrow slit in the outer surface thereof extending transversely of the axis of the holder and adjacent to the bottom of the recess and in communication through the wall of the head with such recess. The slit is configured to permit the electrical terminal to be inserted therein via the recess in the head and to be removed therefrom for simple installation of a brush within the holder. The slit is sufficiently small to not materially impair the structural integrity of the holder such that the novel holder is less subject to breakage due to tightening of the retaining cap or due to an accidental blow to the holder head which is outside the motor or generator housing.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
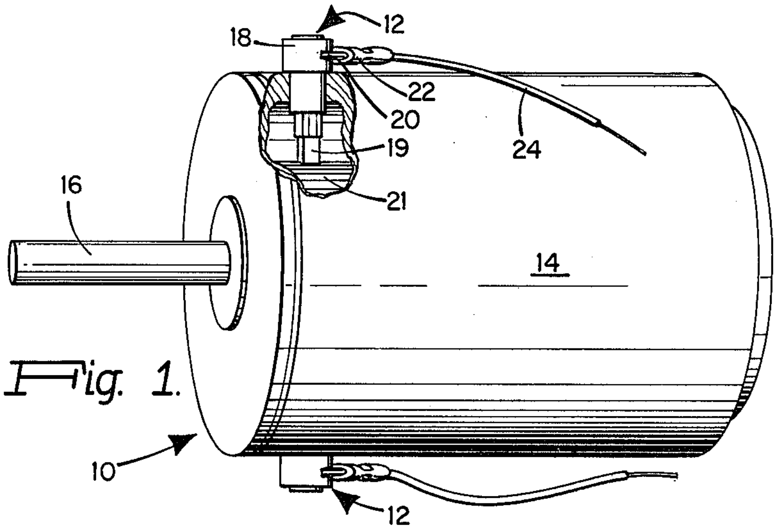
FIG. 1 is a pictorial view of a motor or generator embodying a brush holder according to the invention.

Referring to FIG. 1, there is shown a rotary electric device such as a motor or generator 10 having brush assemblies 12 embodying the present invention. The motor or generator 10 includes a housing 14 and a rotary shaft 16 and can be of any well known construction to suit the specific device requirements. Each of the brush assemblies 12 includes a brush holder 18 containing a carbon brush 19 therein for contact with the commutator 21 or slip-rings of device 10, and an electrical terminal 20 external of holder 18 and by which the brush is connected to an energizing source in the case of a motor or to a load in the case of a generator. Connection to terminal 20 is usually made by means of a slip-on connector 22 and associated wire 24.

Figure 2:
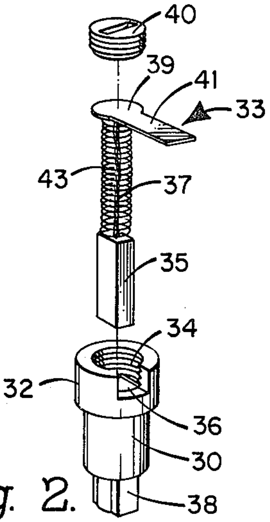
Fig. 2. PRIOR ART
FIG. 2 is an exploded pictorial view of a prior art brush holder and brush.
Figure 5:
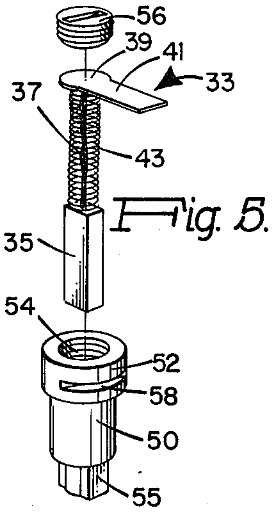
FIG. 5 is an exploded pictorial view of the novel brush holder and associated brush and cap.
Figure 3:
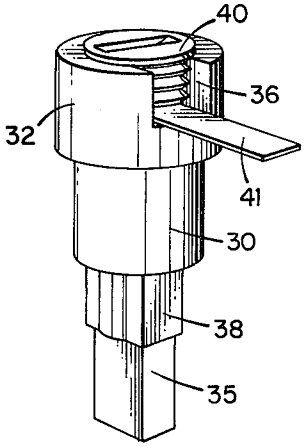
PRIOR ART Fig. 3.
FIG. 3 is a pictorial view of the prior art holder with the brush therein.

A prior art brush holder of the type employed with a brush having an external terminal is illustrated in FIGS. 2 and 3 and includes a cylindrical body 30 having an enlarged head portion 32. The head portion 32 includes a threaded recess 34 therein extending inwardly from the surface of the head portion. A slot 36 is provided in the wall of head portion 32 of a width to accommodate the electrical terminal 33 of a carbon brush 35 and extending to the bottom of the threaded recess 34. A conductive sleeve 38 is secured within the body 30 and in which is slidably disposed the brush 35.

In well known manner, the carbon brush is itself connected by a shunt wire 37 to the electrical terminal 33 which includes a circular portion 39 conforming to and disposable within recess 34 of head portion 32 and an outwardly extending tab 41 to provide external electrical connection to the brush. A spring 32 is disposed around the shunt wire between the confronting surfaces of the brush and the terminal and which serves during installation of the brush within the holder to spring load the brush within sleeve 38 such that the brush is urged against the associated commutator or slip-rings of the electrical device in which it is employed. The brush is retained within the holder by means of a cap 40 which is threaded into recess 34 to secure the terminal 33, at the bottom of the recess, as illustrated in FIG. 3. The slot 36 prevents the head portion 32 from being of continuous cylindrical configuration and also prevents a continuous thread from being provided within recess 34. The head portion is by reason of the slot 36 fragile and the head portion can be easily cracked or broken by inadvertent striking of the head or by threading of cap 40 too tightly into recess 34.

Figure 6:
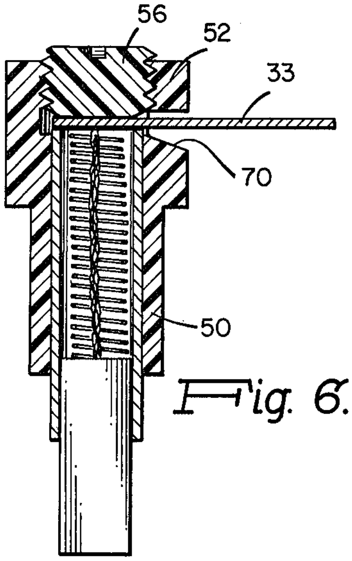
FIG. 6 is a cutaway elevation view of the novel brush holder containing a brush and terminal retained therein.

The improved brush holder constructed according to the invention is shown in FIGS. 4 through 7 and is generally similar to the above-illustrated prior art brush holder except for a highly important improvement in the head portion of the holder which enhances the strength and overall utility of the holder. The improved holder includes in the illustrated embodiment, a cylindrical body 50 having an enlarged cylindrical head portion 52 of closed configuraion and having a threaded recess 54 provided in head portion 52, the recess having continuous threads therein for mating with a threaded cap 56. A conductive sleeve 55 is retained by body 50 for accommodation of the carbon brush 35. A slit 58 is provided in head portion 52 extending transversely of the axis of body 50 and providing an opening through the wall of head portion 52 terminating within recess 54 at or near the bottom of the recess, as best seen in FIG. 6. The slit 58 is narrow along the axis of the holder and is configured to permit the electrical terminal 33 of the brush to be inserted and removed via recess 54, while not materially altering the strength and mechanical integrity of the holder. The slit 58 can be formed during the molding of the brush holder or can be provided by sawing or otherwise producing the transverse slit in a previously formed body.

Figure 7:
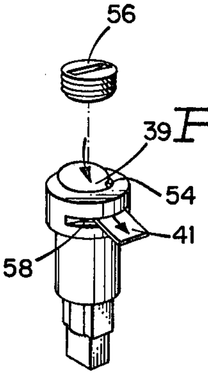
FIG. 7 is a pictorial view illustrating installation of the terminal of a brush into the novel brush holder.
Figure 4:
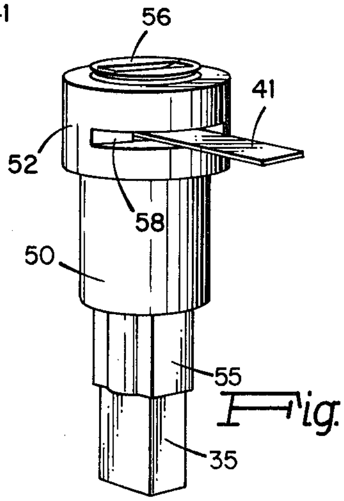
FIG. 4 is a pictorial view of a brush holder according to the invention with a brush installed therein.

As seen in FIG. 7, in order to install a brush within the novel brush holder, brush 35 is inserted into sleeve 55, and the terminal tab 41 is inserted angularly through recess 54 and then through slit 58. The terminal is then pivoted to seat the circular portion 39 at the bottom of recess 54, with the tab 41 extending outwardly through slit 58 at approximately a right angle to the axis of the holder. The brush is retained in the holder by threading of cap 56 into recess 54. In order to remove the brush from the holder, the threaded cap 56 is removed from the head portion 52, and terminal 33 is tilted to cause the tilting of the circular portion 39 outward of the recess such that the tab 41 can be withdrawn from slit 58 and the brush thereafter withdrawn from the holder. The slit 58 is sized and configured to just permit insertion and removal of the brush terminal 33 without materially altering the mechanical strength and structural integrity of the head portion 52 of the brush holder. The upper and lower surfaces of slit 58 can be parallel as shown in FIG. 4 or either or both surfaces can be downwardly slanted. For example, as shown in FIG. 6, a downwardly sloped surface 70 is provided to readily accommodate tilting of brush terminal 33 for ease of insertion and removal. The slit 58 can be of any other convenient configuration to provide for installation of the brush terminal.

The head portion of the body has a closed continuous wall surrounding the threaded recess, and the recess contains a continuous thread unbroken by a large slot, as in the prior art holder. As a result, the improved brush holder is substantially stronger than the prior art holder described above and is less subject to breakage. The cap 56 can be tightly threaded into recess 54 without damage or fracture of head portion 52.

It will be appreciated that the holder body can be other than cylindrical and the head portion may or may not be of enlarged form. In some instances, the conductive sleeve can be eliminated, with the carbon brush being retained directly within the longitudinal opening in the body. Accordingly, the invention is not to be limited by what has been particularly shown and described except as indicated in the appended claims.

What is claimed is:

1. A brush holder for containing a carbon brush having an external terminal which includes a generally circular portion conforming to and disposable within a recess of the brush holder, and an outwardly extending tab, and comprising:

a unitary hollow body of electrically insulative material and including a head portion at one end thereof having a continuous wall defining an internally threaded recess;

said recess being configured to receive in threaded relationship a threaded cap therein for retention of a carbon brush in said body;

an opening extending through the body along the longitudinal axis thereof and of configuration to slidably contain a carbon brush disposed therein;

said head portion having a narrow slit therein communicating between the outer surface of said head portion and said recess at a portion adjacent to the bottom of said recess and extending transversely to the axis of said body, said slit adapted to receive the electrical terminal tab of a brush, said recess being adapted to receive the generally circular portion of the electrical terminal for retention by said threaded cap.

2. The brush holder of claim 1 wherein said body includes an electrically conductive sleeve supported therein and adapted to slidably contain said carbon brush.

3. The brush holder of claim 1 wherein the slit in said head portion includes confronting parallel surfaces separated by an amount to accommodate the terminal of said carbon brush.

4. The brush holder of claim 1 wherein the slit in said head portion includes a surface substantially contiguous with the bottom of said recess and downwardly sloping therefrom to accommodate insertion and removal of the electrical terminal of said brush by way of said recess.

5. A brush holder for containing a carbon brush having an external terminal which includes a generally circular portion and an outwardly extending tab, and shunt wire and surrounding spring coupling the terminal to the brush and a unitary hollow cylindrical body of electrically insulative material and including at one end thereof an enlarged head portion having a continuous circumferential wall defining an internally threaded recess;

said recess being configured to receive in threaded relationship a threaded cap therein for retention of a carbon brush in said body;

an opening extending through the body along the longitudinal axis thereof;

an electrically conductive sleeve supported in said longitudinal opening of said body and of configuration to slidably contain a carbon brush disposed therein;

said head portion having a narrow slit in the circumferential wall extending transversely to the axis of said body and communicating between the outer surface of said head portion and said recess at a position adjacent to the bottom of said recess, said slit being adapted to receive the electrical terminal tab of a brush, said recess being adapted to receive the generally circular portion of the electrical terminal for retention by said threaded cap.

* * * * *

UNITED STATES PATENT AND TRADEMARK OFFICE

CERTIFICATE OF CORRECTION

PATENT NO. : 4,095,131

DATED : June 13, 1978

INVENTOR(S) : Richard J. Febonio

It is certified that error appears in the above-identified patent and that said Letters Patent are hereby corrected as shown below:

Column 2, line 66, "configuraion" should be --configuration--.

Column 4, line 39, after "and" insert --comprising;--

Signed and Sealed this

***Sixteenth* Day of *January 1979***

[SEAL]

*Attest:*

RUTH C. MASON
*Attesting Officer*

DONALD W. BANNER
*Commissioner of Patents and Trademarks*